June 1, 1926.
C. H. TAYLOR
GEARING
Filed Oct. 22, 1923 — 4 Sheets-Sheet 1
1,586,861
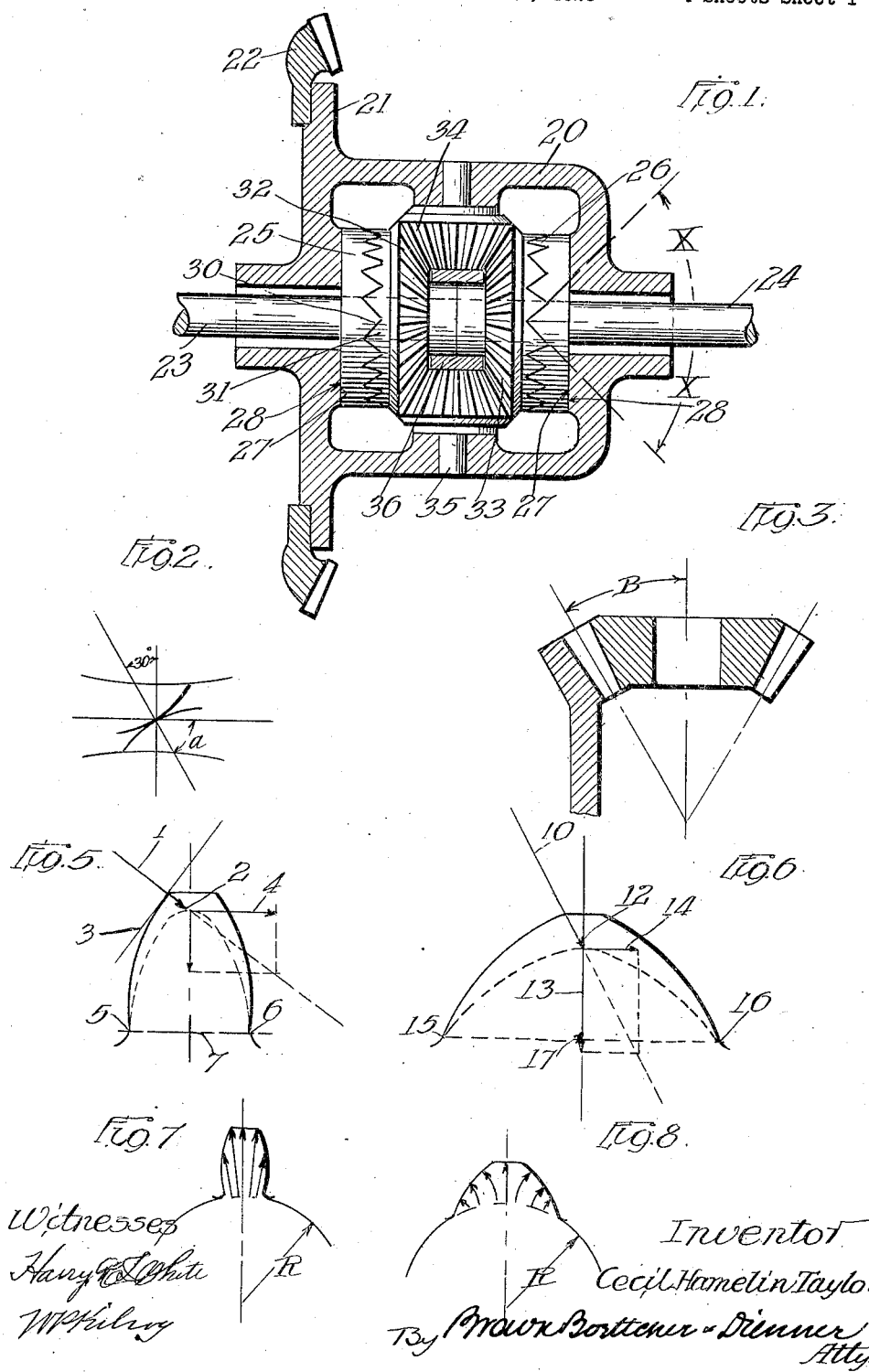

June 1, 1926.

C. H. TAYLOR 1,586,861

GEARING

Filed Oct. 22, 1923

Witnesses:
Harry B. L. White
W. R. Kilroy

Inventor:
Cecil Hamelin Taylor.
By Brown Boettcher Dinner
Attys

June 1, 1926.
C. H. TAYLOR
GEARING
Filed Oct. 22, 1923
1,586,861
4 Sheets-Sheet 3
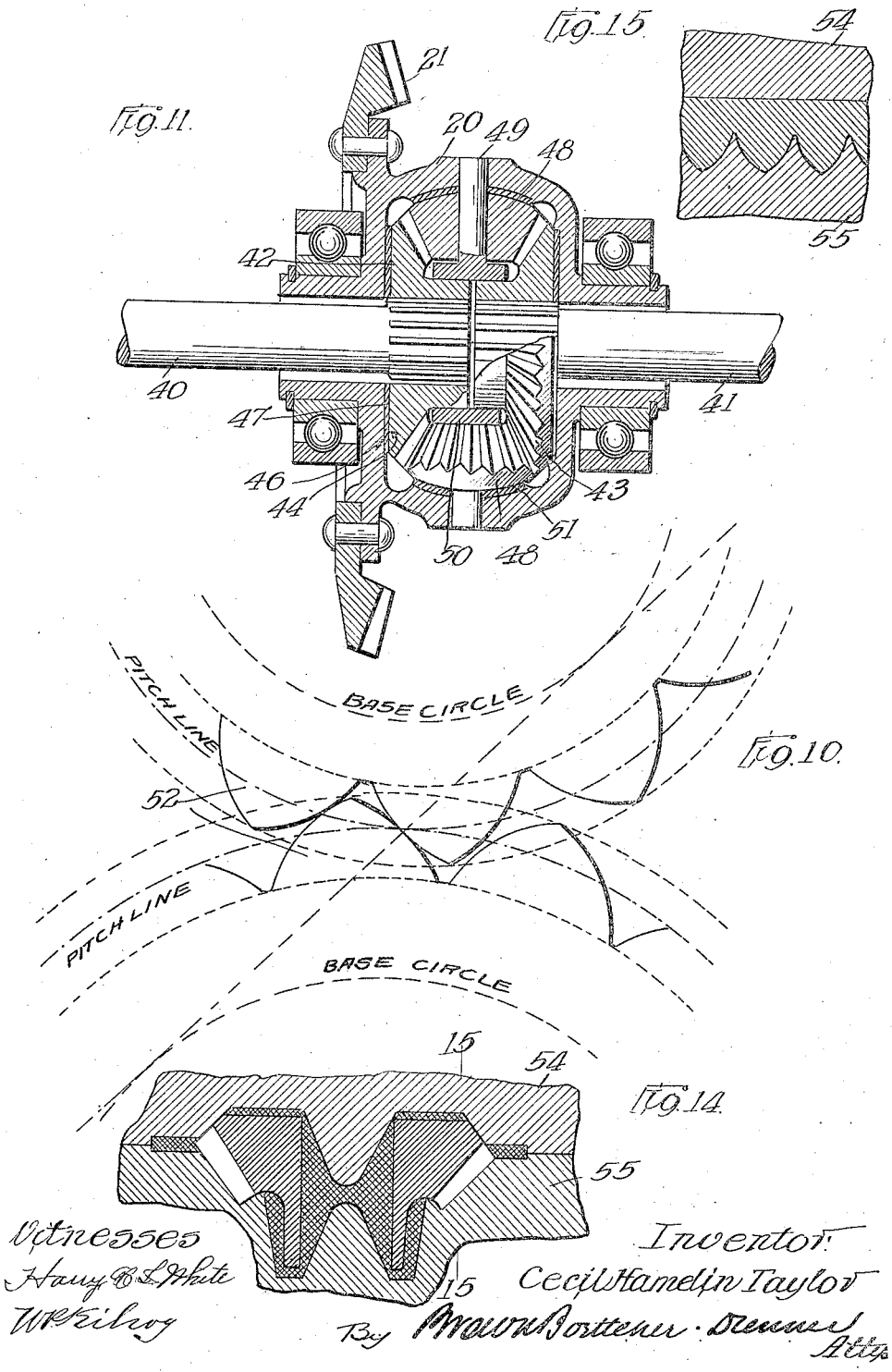

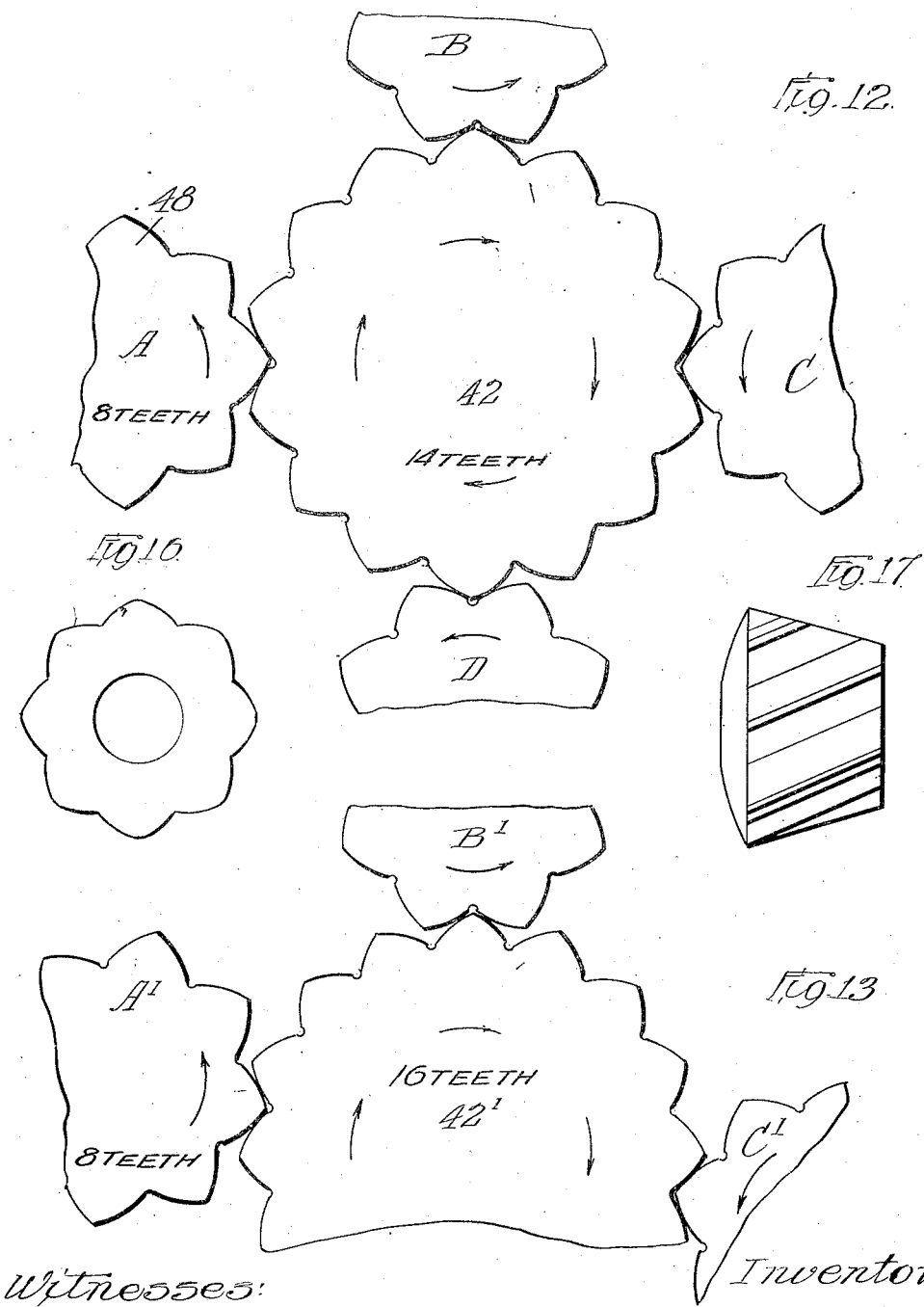

Patented June 1, 1926.

1,586,861

UNITED STATES PATENT OFFICE.

CECIL HAMELIN TAYLOR, OF DETROIT, MICHIGAN.

GEARING.

Application filed October 22, 1923. Serial No. 669,889.

My invention relates to gearing and more particularly to differential gearing for automobiles and the like, for driving the two axle sections of a driving axle of a motor driven vehicle.

It is desirable to permit differentiation between the two driving wheels while the vehicle rounds a curve. It is also desirable to prevent stalling of the vehicle by idle spinning of a driving wheel that loses its traction. These two requirements are fundamentally in conflict in the usual type of differential now employed in power vehicles. The so-called "locking" differential has been developed to meet these requirements. This so-called locking differential has been proposed in three fundamental types:—

(1) The over-running clutch type such as is disclosed in the United States patent to Rogers, No. 1,002,870.

(2) The locking worm and worm wheel type such as is disclosed in the U. S. patent to Brown, No. 1,268,429.

(3) The cam and friction type such as is shown in my copending application No. 358,389.

The over-running clutch type was first developed. It is least advantageous as no true differential action occurs. All the torque is put upon the slower moving wheel at all times and the faster moving wheel runs ahead idle. Generally if it runs ahead too far it causes trouble. This type so far has proven impracticable.

The second type employing a locking worm and worm gear or its equivalent was next developed while the cam and friction type was last developed. In both of the second and third types a sliding friction between the two pressure elements occurs. Of these two types the last is more advantageous. The locking worm type embodies considerable difficulty in the manufacture of the worm and worm wheels, and it entails a sliding friction for normal differentiation as well as for locking. Due to the relatively high pressure on limited areas, rapid wear results. The last form is simpler and appears so far to give the best results. Its use entails considerable additional expense over the plain differential and it introduces an element of back-lash which is not desirable, but it is preferable to the earlier types. In said last form the usual driving pinion and ring gear together with the cage, bevel pinions and bevel wheels are employed, and then there are provided additional cam means for performing the function of securing a thrust either radial or axial with respect to the axle sections which produces the desired friction. These additional elements require added expense and a complete re-design of the differential. That is to say, they cannot be substituted for standard parts now in existence.

I have conceived that the additional cam mechanism, which is required by the last type above referred to, may be dispensed with as such and the camming function embodied in the co-operating teeth of the differential gears and pinions themselves. I have further conceived the possibility of substituting such novel gears for the standard gears now in use on cars and in the place of such gears without requiring further room.

The teeth which I term gear teeth are, in fact, gear teeth, and function with the usual rolling action to transmit power.

I fulfil in the construction of my invention two conflicting requirements, namely:—

(1) Rolling friction for power transmission, (2) Large reaction pressure tending to throw the teeth out of mesh by a sliding cam action between the teeth. In other words, the prior art conception of external camming surfaces which press the meshing gear teeth into each other tending to cause bottoming and excessive wear, such as is illustrated in Figure 1 of the accompanying drawings, has now been reversed and the meshing teeth spread their gears apart to secure the clutching action against the cage without any intermediate mechanism or multiplying means such as multiple disc-clutch mechanism or a cone-clutch mechanism.

To carry my invention into effect, it is necessary to construct special tools since the gears of my invention cannot be cut on any previously known standard gear cutter as I found upon trying to have them cut for the first time.

Now, in order to explain first the broad principles of my invention as required by the statute, I shall refer hereafter to the figures appearing on sheet 1 of the accompanying drawing which bears diagrams useful in giving an understanding of my invention.

On Sheet 1, Figure 1 is a diagrammatic showing of the type of device such as is shown in my co-pending application, Serial No. 358,389, filed February 13, 1920, and above referred to as the cam and friction type of locking differential;

Fig. 2 is a diagram illustrating the pressure angle of the teeth of a gear;

Fig. 3 is a diagrammatic illustration of the angle B indicating the angularity of a pinion and gear of a pair of bevel gears;

Fig. 5 is a diagram illustrating the forces acting upon a gear tooth of conventional construction;

Fig. 6 is a similar diagram illustrating the operation of forces upon a gear tooth of my invention;

Figs. 7 and 8 are diagrams illustrating the action of metal flowing into die materials;

Fig. 10 is a cross sectional view of a differential embodying my invention;

Fig. 11 is a diagram illustrating the construction of the teeth of gears embodying my invention;

Figs. 12 and 13 are diagrams illustrating the action of gears and pinions of this character;

Fig. 14 is a cross sectional view through a die mold and pinion, showing how the pinion may be manufactured by drop forging;

Fig. 15 is a fragmentary sectional view taken on the line 15—15 of Fig. 14; and

Fig. 16 is a plan view and Fig. 17 is a side view of a spiral bevel pinion of my invention.

Figure 4:
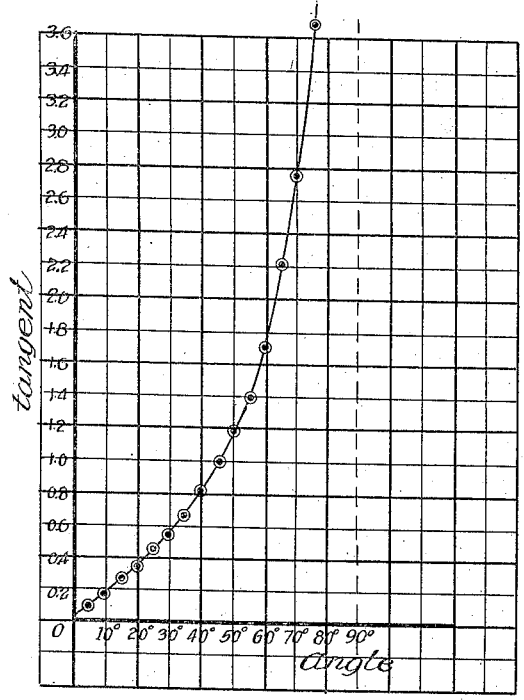
Fig. 4 is a chart showing the mathematical tangent curve.

Gear teeth as now known are of two types—cycloidal and involute. I select the involute type of teeth for purposes of illustration as being the form most easily shown and understood. This type furnishes the requisite strength. Nearly all commercial gear cutting machines are equipped for cutting gear teeth of this type.

In order to secure the desired action of clutching the gears and hence the axle sections to the cage without further multiplying means, it is necessary that the friction between the cage and the gear be substantially equal to or greater than the torque tending to move these parts relatively to each other.

Assuming that in a differential of the above type:

$$F = T \quad (1)$$

where F is the friction moment holding or clutching the wheels and cage together, and T is the torque at unit radius tending to move the parts with respect to each other.

Now, the force of friction depends upon the area A, the coefficient of friction $f$, the mean radius of the friction surface R, and the pressure P upon said surface or area, so that:

$$AfPR = T \quad (2)$$

The circular area of contact between the cheek of the gear wheel and the cage may be represented by the following equation:

$$A = \pi R^2 \quad (3)$$

where, however, R has been chosen as unit radius. This assumption of the value of A is slightly too large because of the space taken up by the axle sections, but this assumption will be sufficiently close for our purposes.

We will assume therefore, $$A = \pi \quad (4)$$
$$P = T \times \tan a \quad (5)$$

because the axial pressure tending to force the wheels apart and into engagement with the cage is a function (tangent) of the angle $a$ of engagement of the teeth for straight gears. However, for bevel gears, this must be modified by a function of the angle B shown in Figure 3. Therefore, for bevel gears as is the case at present:

$$P \cos B = .87 P \quad (6)$$

where the angle B is 30° on the pinion as may be assumed to be the case in the present construction. Hence equation 2 becomes:

$$\pi T \cos B \tan a \times f = T \quad (7)$$

and assuming for purposes of illustration a value for $f$ of .25, we may write the equation as follows:—

$$3.1416 \times .87 \times 25 = \cot a \quad (8)$$
$$\cot a = .684 \quad (9)$$
$$a = 55° - 30' \quad (10)$$

However, the above calculations for angle $a$ merely indicate the general nature of the angle required. The value of $f$ chosen above may be high. Hence, it is likely that a steeper angle may be required under normal conditions if the friction is to be great enough to hold or clutch the parts together completely. Where a complete locking is not required, and this would be the average condition, the angle need not be quite as large. In general, however, the angle must be in excess of 45° in order to secure a greater pressure upon the clutch element than the tangential tooth pressure. In practice I prefer to use a pressure angle between 50° and 70°.

It is known that in calculating the number of teeth upon a pinion with present commercial gear profiles the lowest number that will give continuous action without undercut is 12 teeth, and commercial gears are figured upon a basis of 12-tooth pinions as the lower limit. Pinions of less than 12 teeth are special.

In order to substitute the present gears and pinions for prior commercial gears and pinions, it is necessary to keep the same relative size of the parts and this favors the use of pinions of less than 12 teeth. The 12 tooth normal pinion is figured as the smallest number which will constantly give smooth continuous action.

In practice I have constructed the pinion of 8 teeth using a 60° pressure angle and have secured satisfactory operation. There are two conflicting requirements to be met: First, the desirability for uniform motion between the gears and pinions which would normally compel a 12-tooth pinion. Second, the necessity for a relatively long tooth to permit of the outward play of the gear wheels with respect to the pinions in their clutching action after the parts have worn loose. But the first requirement for continuous action cannot be satisfied by increasing the number of teeth. Increase in the number of teeth with a pressure angle as large as I employ will not give uniform motion as the ratio between the arc of correct roll and the pitch remains constant. Hence all that increasing the number of teeth would do is to decrease the amount of inequality by bringing the pitch circle, root circle and tip circle closer together as the teeth become shorter and to increase the frequency of the irregularity. A certain amount of play must be allowed to ensure meshing of the teeth after prolonged wear as above referred to. That is to say, the pinions must be able to force the gears out axially to secure the clutching action after long wear. If the motion required to secure the clutching action were in excess of the length of the teeth, obviously the teeth would slip past each other and breakage might be expected.

I am aware that it has heretofore been proposed to employ the effects of the pressure angle of the teeth to secure a clutching action between axle sections. (See British Patent No. 27,123 of 1911 to Goodhart, and see British Patent No. 7,557 of 1915 to Wolseley Motors.) But I wish to call attention to several fundamental errors in said proposals which have kept such constructions from being usable. First, and perhaps least important, is the fact that they employ friction multiplying devices which compel a complete re-design of the differential. Second, the presence of these friction multiplying devices requires an excessive axial movement of the clutch parts greater than is permissable with gears now known resulting in at least two fatal defects.

(1) By the unusual separation of the gears stresses are created upon the teeth resulting in improper action and excessive wear.

(2) Abnormal back-lash, which results in stresses upon the teeth which they were not designed to stand, and particularly results in discomfort to the occupants of the vehicle.

(3) Excessive wear on the teeth because of the unusual degree of endwise motion and the relatively small pressure angle.

I am further aware that it has been proposed to increase the pressure angle to assist the action of said clutching devices. This would only make matters worse in the construction as proposed as it would reduce the strength and wearing qualities of the gear teeth to a greater extent than it would increase the friction unless other means were employed to compensate for such change. Even if it did result in an increase of tooth pressure, and hence, friction, it would produce a relatively small change, that is, merely a change in degree, because a change of the normal tooth angles by the degree permissable in the constructions heretofore known, would not create anything but a small change in degree.

For example, assume that the pressure angle of the above construction is 14½°. The tangent of 14½° is .26. Now, assume that the highest commercial angle which is now in use were employed, namely 22½°. The tangent of 22½° is about .41, only about half again greater than that of the previous value.

In certain of the gears which I have employed the pressure angle is 60°. The tangent of 60° is 1.73 or about 5½ times greater.

Now, in connection with the above enormous increase in pressure which my gears secure, I wish to call attention to a remarkable property of my gears which marks them as different in kind from the gears of the prior art, and that is that the teeth are unbreakable by the pressure of a co-acting tooth.

Referring to Figures 5 and 6 of the drawings, I have shown in Figure 5 a tooth of conventional design. According to the formulæ and methods developed by Mr. Wilfred Lewis, the stress upon a tooth may be taken as a concentrated load upon the outer corner of the same. This is represented by arrow marked No. 1, normal to face of the tooth at this point. The line of force is extended to the points 2 where it intersects the median radial line of the tooth. At this point the force is resolved into its components represented by arrows 3 and 4 radial and tangential respectively. A parabola may now be drawn through point 2 and tangent to the flanks of the tooth outlined.

This indicates at the point of tangency the weakest section of the tooth at the line 5—6. Now, since the force 4 acts tangentially about the point 6 with the lever arm equal to the line 2—7, and since the radial force 3 acts about the pivot 6 with the lever arm equal to the line 7—6, it can be seen that increasing the force 1 will break off the tooth along the line 5—6.

Now, referring to the diagram of Figure 6 where I have illustrated a tooth outline embodying my invention, it can be seen that since the force 10, which may be taken as the load applied to the tooth, when prolonged falls within the base line 15—16, this tooth cannot be broken off by bending stresses imposed by the applied tooth pressure, and if it yields it will be by crushing or shearing. Hence, the tooth is unbreakable.

I do not want to confine the invention to teeth which are theoretically or mathematically unbreakable, but the marked increase in tooth pressure angle which is desirable according to my invention, also carries with it unbreakability or substantial unbreakability in practice.

Where the angle of tooth pressure lies around 45° or above that value, the desired increase in pressure for friction purposes appears, and also at about this point such a vast increase in strength of the tooth occurs as to give the same the desirable result of practical unbreakability.

Now, the increase in the pressure angle which so greatly increases the pressure available for friction clutching and which makes the teeth unbreakable or substantially so, together with the necessity for a fairly long tooth to give sufficient axial motion, entails a difficulty, to-wit: a pitch so coarse that discontinuity of action occurs. This tends to introduce an element of irregular driving if not otherwise corrected. I reduce the difficulty by employing a plurality of pinions which while they move synchronously, are not in phase, that is, do not go through the same point in a cycle of operation at the same time. This is accomplished by unequal spacing of the carrying arms or pins about the circumference of the differential gears, or by employing a number of teeth on the side gears divisible by the number of phases but not by any multiple of the number of phases. If it is desired to reduce the inequality of driving still further the meshing teeth may be cut on a spiral of such a degree that the meshing of a pair of the spiral teeth will extend over the pitch distance, i. e., until the next pair of teeth come into mesh and take up correct driving action.

This spiral formation may be relied upon independently of the number of teeth, but the two methods of correction work together admirably.

While as pointed out above, it is highly improper in ordinary practice to separate gears to such an extent that only one pair of teeth engage, according to my invention no disadvantage results because the teeth are unbreakable, and correct selection of the number of teeth and formation of the teeth on a spiral avoids discontinuity of drive.

I now wish to point to another novel advantage which flows from the employment of a large pressure angle namely, at or beyond 45°, and that is the ease and cheapness of construction. In practice I have employed a 60° pressure angle with 8 teeth on the pinions and 14 teeth on the gears as substitutes in place of the standard pinions of 12 teeth and gear of 21 teeth now employed in the Ford Model T automobile. When an angle of this character at a consequent coarseness of pitch of the degree preferred for the above is employed, it is possible to make the gears by the well known process of drop-forging without injury to the steel and with highly satisfactory result. Where the teeth are long relative to their pitch distance as in the gears of the prior art, such operation is attended with too great difficulty. There are a number of reasons why gears of the prior art have not been successfully produced by drop-forging.

(1) The angle for flow of the metal is too sharp for material of the class required for automobile gears resulting in unfilled dies and excessive wear upon the dies.

(2) The metal which is required for automobile gears is too tough and difficult to work, and if it is forced to the degree called upon for the production of bevel pinions heretofore known, the steel would be so much injured as to reduce their strength considerably.

(3) The teeth are so thin and long that chilling of the teeth occurs before they can be formed, also resulting in uneven quality of the steel.

Now, in drop-forging the gears of my invention, the above defects are obviated and a novel and useful effect is secured which provides a dense, tough working face for the gears peculiarly adapting them to function in the present device.

Referring to diagrams in Figures 7 and 8, it will be seen that in making the pinion of my invention, the metal entering the tooth mould moves mainly in a direction substantially normal to the working face of the tooth. Since the working face of the tooth is subject to compression (being an unbreakable tooth) in excess of the bending stress it can at once be seen that the metal is compressed and made denser at the working face and the quality of the gear is thereby improved. This is readily understood when the action of a plastic material is considered. The advancing edge of a plastic material in a mould is not sharp and will not readily expand laterally.

If it were attempted to fill the tooth of a standard pinion as shown at Figure 7, there would be difficulty first in filling the teeth, due to the rapid cooling of the metal and next, due to the necessity for expansion after passing the narrow neck at the base of the tooth. The greatest fault would be the weakness caused at the base of the tooth by the excessive movement of the metal at this point. This movement, instead of being gradual and fairly equally distributed, would be exceedingly sharp along a line substantially radial and forming a continuation of the flanks of the teeth. This would introduce a line of weakness which would render the gear of questionable value. If it were possible to make gears by filling the teeth by pressure as shown in Figure 7, the resulting tooth would be weaker than a tooth cut from a solid blank. However, the teeth made by filling a die as shown in Figure 8, do not partake of such weakness, and in fact, if properly made, their surfaces are stronger and denser than is the case in teeth cut from a solid blank, particularly so where the gears are restruck in finishing dies.

While I shall herein describe a differential in which the gears and pinions are bevel, it is to be understood that the same principle may be applied to straight or helical spur gears or to the spiral bevel gears as shown in said copending application above referred to.

In order to acquaint those skilled in the art with the manner of constructing and operating my invention, I shall now describe a specific embodiment of the same in connection with the accompanying drawings.

Referring now to the drawings, Figure 1 illustrates a differential of the type disclosed in my copending application 358,389. The cage 20 has a suitable flange 21 to which a driving ring gear 22 is connected. A pair of axle sections 23 and 24 extend into the cage and are splined into the hubs of the disc members 25 and 26. These disc members have friction surfaces upon their backs as indicated at 27 for engaging co-operating friction surfaces 28 formed upon the inside of the cage 20. These friction members 25 and 26 have cam teeth 30 formed upon their front faces which co-operate with similar cam teeth 31 formed upon the back of the bevel gears 32 and 33. These bevel gears 32 and 33 co-operate with a series of bevel pinions 34 which are mounted upon suitable pins 35, the outer ends of which pins are secured to the cage 20 and the inner ends of which pins are secured to the ring or spider 36. The bevel gears 32 are loose with respect to the shaft sections 23 and 24 and they transmit torque only through the teeth 30 and 31. The action of the device is as follows: During normal running the two axle sections 23 and 24 move together under the torque of the ring gear 22 which torque is transmitted partly through the bevel pinions 34 to the teeth 30 and 31 and thus to the axle sections and also partly through the cage 20 and the frictional engaging surfaces 28 and 27 to the axle sections 23 and 24. Upon rounding a curve the differential action occurs as before. The drive coming from the ring gear 22 is transmitted to the two axle sections 23—24 in proper ratio but with the addition of a certain amount of internal friction. The cage 20 is driven forward at the same speed and the outer wheel is driven at a certain greater rate of speed and the inner at a certain less rate of speed, the result is the outer wheel overruns the cage by N per cent and the cage overruns the inner wheel by N per cent, the relative slippage of the cage with respect to the axle sections being the same upon each side.

Upon loss of traction by one wheel the tendency for that wheel is to spin idly due to the differential. However, the slight resistance which the wheel still encounters is sufficient when acting through the cams to cause relatively great friction between the cage and the axle sections with the result that a large part of the torque is applied to the wheel which has traction.

It will now be observed that the angle of the coacting cams 30 and 31 must be relatively large in order to secure the pressure required for locking or substantially locking the frictional surfaces 27 and 28 together. The total angle of the cams 30 and 31 is preferably considerably in excess of 90° so that the line of action of one tooth upon another will create a greater axial thrust than transmitted circumferential thrust or torque at the same radius.

The disadvantage of this type of gearing is that the pressure between the teeth 30 and 31 causes the bevel gears 32 and 33 to be thrust axially inwardly thus forcing the teeth of the gears 32 and 33 into the teeth of the pinions 34 so that bottoming of these teeth tends to occur with unsatisfactory operation and rapid wear, unless means is provided to prevent it.

As above explained, I have combined the wedging action of the cams 31 and 30 with the normal rolling or power transmitting action of the teeth on the gears 32—33 and pinions 34.

Figure 9:
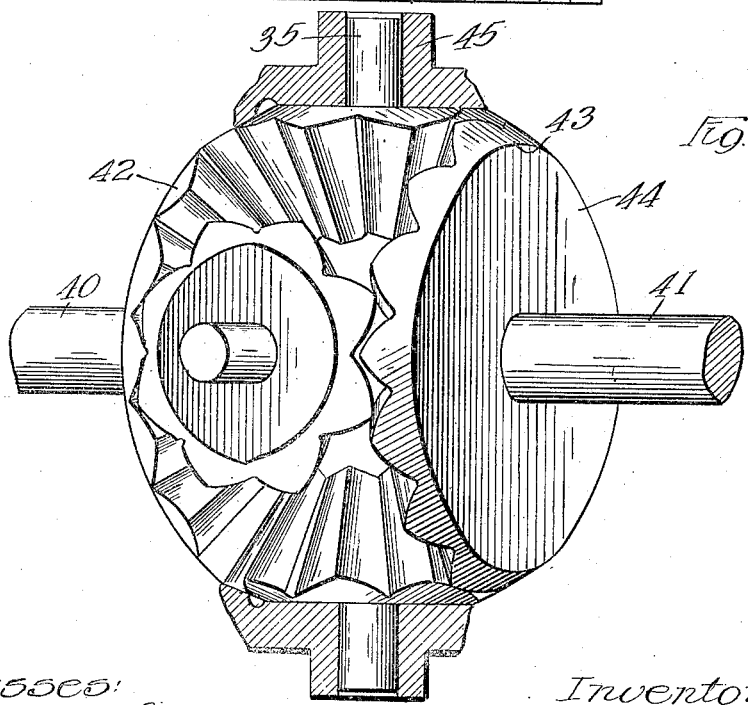
Fig. 9 is an isometric view showing gears and pinions with straight teeth mounted in a suitable cage.

Now, referring to Figure 9, the axle sections shown at 40 and 41 are connected directly to the bevel gears 42 and 43. These bevel gears have flat faces 44 which are adapted to engage co-operating flat surfaces on the interior of the cage 45 as will be more apparent from Figure 11. A friction washer 47 which may be made of a suitable asbestos composition or the like is shown at 47 between the friction surfaces 44 and 46. This, however, does not alter the fact that the entire friction is between the surfaces 44 and 46 since the washer 47 is not held and there is no multiple disc effect.

The pressure for holding the friction faces 44 and 46 in clutching relation with each other is developed by the reaction between the teeth of the gear wheels 42 and 43 and the interposed pinions 48. These pinions are mounted upon pins 49 extending from spider 50. The pinions 48 also tend to frictionally engage the cage 20 from the reaction developed between the teeth and suitable friction washers 51 are interposed between the backs of the pinions and the cage 20. The teeth of the co-operating gears and pinions are formed with pressure angles in the present case of substantially 60° which I have found to be entirely suitable in practice, although I do not wish to confine the invention to this value only. The reactive pressure should be in excess of the torque pressure in order that sufficient friction may be developed to secure substantial locking of the parts under loss of torque on one of the axle sections. As will be apparent from Figure 10, the tooth shape is that generated by the involute curve. The pitch of the teeth is relatively coarse in order to secure sufficient length of the teeth so that the pressure developed may move the gears axially without the teeth losing contact after much wear. The teeth may be formed either by cutting out of a solid blank or they may be formed by drop-forging as illustrated in Figures 14 and 15. In practice these teeth are rounded or flattened off slightly at the tops and thus as the angle of tooth pressure approaches substantially 45° the teeth become unbreakable by tooth pressure applied normal to the face thereof by coacting teeth. That is to say that the tooth cannot be broken by bending stress, and if it yields it will either be sheared off or crushed. When I speak herein of unbreakable teeth, I do not mean teeth which are strictly 45° or more, but I intend to cover teeth which are practically unbreakable under the usual working conditions. The teeth 52 may be either straight or spiral on these bevel gears but the resulting cam action is the same. The use of spiral teeth will be explained in connection with Figs. 16 and 17.

The manner in which this device of Fig. 11 operates is apparent from the description of Figure 1. When the two axle sections are advancing at an equal rate the drive is partly through the gear teeth and partly through the friction surfaces. When one axle section advances at a greater rate than the other, the advance of its connected gear wheel overruns the cage 20 and at the same time the cage 20 overruns the other axle section and its gear by the same amount. The friction thus is substantially equal between the cage and each axle section. When one wheel loses traction it tends to take up the entire motion of the driving shaft and cage, but the axial pressure created by driving the wheel idle is sufficient to cause a relatively large friction between the cage and the other axle sections. If the relatively free wheel has even a slight friction against slippage the resultant internal friction of the differential puts a large percentage of the torque upon the wheel which has traction.

I have found that in constructing the teeth of the gears of my invention, the usual gear cutter now in use generally is not adapted to cut a tooth with as great a pressure angle as called for by the present invention. However, the gears can be cut and I have in practice thus manufactured samples which were completely satisfactory.

These gears may be made by forming the teeth by drop-forging, as shown in Figures 14 and 15. The co-operating matrices or dies are shown at 54 and 55. They are so shaped as to provide a blank having substantially finished teeth as will be apparent from the drawings. The blank is then machined to the finished form, the parts shown in double cross hatching being removed.

Due to the coarse pitch of the teeth and the large pressure angle, the movement of the metal into the dies forming the teeth is such as to compact the working faces of these teeth. There is a peculiar relation between a tooth subjected to a large reactive pressure due to co-operating teeth, and the forming of the teeth with this dense, tough working face. The metal moves into the matrix for the tooth along lines of movement substantially normal to the working surface. The result is a tooth having a working face compacted by pressure and highly effective to withstand the stress of compression and friction which comes upon the same due to inter-engagement of the teeth. In other words, the stress produced by the reaction between teeth is substantially in line with the line of movement of the metal into the tooth mould.

Due to the form of the teeth and the high pressure angles which are employed, the arc of correct contact between the gears and pinions is less than that which occurs in the known types of gearing now in use. The arc of contact is, in fact, less than the angular pitch with a consequent tendency to give an irregularity of transmission due to irregularities of angular velocity at the different points in the cycle of tooth contact. This objection may be deduced by suitably arranging the number of teeth which coact or may be entirely removed by forming the teeth into conical helices of sufficient angle to extend through an arc equal to or greater than the pitch angle divided by the number of meshing phases.

In the diagram of Figure 12, I have indicated the master gear 42 and the satellite pinions A, B, C and D. In this case the master gear 42 has 14 teeth and the pinions have 8 teeth with the result that with equal spacing of the pinions A, B, C and D about the master gear, the pinions are in different phase relation—the pinions A and C being in substantially the same phase relation, and the pinions B and D being substantially the same phase relation with respect to each other, but the two pairs being in different phase relation with respect to each other.

In Figure 13 the satellite pinions A'—B'—C' and D' are spaced about the periphery of the master gear by unequal intervals with the result that the teeth of the pinions are in different phase relation. This unequal spacing may be in pairs or each spacing may differ from every other spacing. In a similar manner, the scheme employed in Figure 12 may be varied so that the teeth of each pinion will be in a phase relation different from that of all of the other pinions.

It is believed that the action of producing a relatively smooth transmission of power with the gears above described will be apparent from the previous description and from the drawings. Suffice it to say that when one tooth of one pinion loses or substantially loses its correct rolling contact with the co-operating tooth of the other gear, the tooth on another pinion takes up correct or substantially correct rolling motion and thus is able to transmit power steadily because of the above stated difference in phase relationship.

In Figs. 16 and 17 I have illustrated a spiral pinion or conical helical pinion in which the length of the tooth and the angle of the tooth being such as to permit the tooth to mesh correctly or substantially correct through an arc equal to or greater than the pitch angle divided by the number of meshing phases. The tooth profile is the same as shown in connection with Figs. 10, 12 and 13. The arrangement of the gears and pinions is the same as that shown in Fig. 11 and the operation is the same except that a smooth action and transmission of power is secured.

The construction of the gears of my invention is less expensive than the construction of standard gears as now employed in automobiles. Also, because no additional room is required to introduce camming devices or friction multiplying devices the gears of my invention may be installed in differentials already constructed and in use. Where the gear teeth are formed by drop-forging there is effected a very considerable saving due to this operation being much quicker than the cutting of teeth from a solid blank. Even where the teeth of my invention are cut from a solid blank, the operation is less expensive because fewer teeth need to be cut.

I employ the term pressure reaction to designate the thrust resulting between the teeth of co-operating gears. In the case of cylindrical spur gears the pressure reaction is radial but in the case of bevel gears it is at an angle.

In conducting experiments and tests upon the samples of gears which I have made in accordance with my invention and in which I used a substantially homogeneous metal so nearly as I can determine, I find that the teeth of these gears are unstripable. By the term "unstripable" in this specification and the claims, I mean that the tooth will not break across the base prior to the destruction of the body of the tooth.

I do not intend to be limited to the details shown or described.

I claim:—

1. In a differential gearing having tooth faces of such an angle that the arc of correct contact is less than the angular pitch, two satellite pinions and master gear wheels, the teeth of said pinions being in different phase relations with the teeth of said gear wheels.

2. In a transmission, in combination a gear having teeth providing an arc of correct contact less than the pitch, a plurality of gears engaging said gear, means for moving all of said plurality of gears in unison, the teeth of said plurality of gears being in different phase relationship with the teeth of the single gear whereby some of said teeth afford correct contact.

3. In a differential gearing having tooth faces of such an angle that the pressure angle shall be from 50 to 70°, two satellite pinions and master gear wheels, the teeth of said pinions being in different phase relations with the teeth of said gear wheels.

4. In a transmission, in combination, a first toothed element, a second toothed element intermeshing therewith, said teeth being shaped so that correct contact for power transmission is intermittent, a third toothed element meshing with said second element and arranged to have correct contact therewith when said first element does not have correct contact, and means for moving said first and third elements in unison.

5. In a differential, a source of power, a plurality of balancing gears actuated by said source of power, and two driven gears associated with said balancing gears, the teeth on said gears being shaped to provide correct contact only intermittently, the different balancing gears being set with their teeth in different phase relations with respect to the driven gears, whereby at least one of said balancing gears always has correct contact with each driven gear.

6. In a differential, a source of power, a plurality of balancing bevel gears actuated by said source of power, and two driven bevel gears associated with said balancing gears, the teeth on said gears being shaped to provide correct contact only intermittently, the different balancing gears being set with their teeth in different phase relations with respect to the driven gears, whereby at least one of said balancing gears always has correct contact with each driven gear.

7. In a differential, a source of power, a plurality of balancing gears actuated thereby, and two driven gears associated with said balancing gears, the teeth on said gears being shaped to provide interengaging contact of varying efficiency, said balancing gears being set with their teeth in different phase relations whereby a relatively inefficient engagement by one balancing gear will be simultaneous with a relatively more efficient engagement by another balancing gear.

8. In a differential, a pair of master gear wheels and a pair of satellite pinions meshing therewith, each of said gear wheels and pinions having a flat frictional surface on its back and bevel gear teeth on its active front surface, said gear teeth being of such a profile as to be substantially unstripable by co-acting tooth pressure, said teeth having a pressure angle creating a thrust upon said frictional surface substantially equal to or greater than the tangential tooth pressure, the tooth faces of both of said gear wheels and pinions being of such an angle that the arc of correct contact is less than the angular pitch, the teeth of the said pinions being in different phase relation with the teeth of said gear wheels.

9. In combination, a housing, and gearing disposed in the said housing including a first gear, and a plurality of gears in mesh with the said first gear, each of said gears having a frictional surface formed on its back and gear teeth on its active front surface, all of said gears employing a pressure angle between 50° and 70°, the teeth of said plurality of gears being in different phase relation with the teeth of said first gear, the said frictional surfaces engaging the said housing and serving to form clutches.

10. In combination, a cage, means for driving the said cage, an axle passing through the said cage, the said axle comprising two parts, each of which project into the cage, the said parts being in alignment, the said cage being provided with flat frictional surfaces substantially concentric with the said axle, wheels on the ends of the axle parts within the cage, said wheels having substantially flat cheeks co-operating with the said frictional surfaces on the cage to form clutches, and pinions mounted in the cage between the wheels, said wheels and pinions bearing co-operating teeth of approximately involute form of a pressure angle great enough to produce sufficient pressure between the clutch members as to create a friction approaching the torque on the cage, the teeth on said pinions being in different phase relation with the teeth on said wheels.

11. In combination, a cage having a plurality of friction surfaces, means for driving the said cage, a pair of differential wheels disposed in the said cage, a plurality of friction members associated with the said wheels and a plurality of differential pinions co-operating with said wheels to produce pressure between said friction members and said friction surfaces, said wheels and pinions having co-operating gear teeth upon them serving as cams, said teeth having pressure angles great enough to produce substantial locking between said friction surfaces, the teeth on said pinions being in different phase relation with the teeth on said wheels.

12. Differential gearing of the planetary bevel wheel type of low mechanical efficiency, comprising a pair of sun wheels and a plurality of cooperating planet pinions, the teeth of which have a predetermined wide angle of obliquity, the number of teeth on each planet pinion bearing such relation to the number of teeth on the sun wheels that, with said predetermined angle of obliquity of the teeth, only one tooth of any pinion will be in driving engagement with the teeth of a sun wheel at a time, the number of planet pinions employed and their disposition about the axis of the sun wheels being such that upon relative movement between the planet pinions and sun wheels, continuous driving engagement is maintained therebetween by said single tooth driving engagement passing to successive pinions.

13. In combination, a differential housing, differential gearing disposed in the said housing including a first gear, and a plurality of gears in mesh with the said first gear, all the said gears having teeth employing a pressure angle of such a value as to develop a pressure reaction not less than the tangential teeth pressure, the teeth of the said plurality of gears being in different phase relation with the teeth of said first gear, and clutch means disposed intermediate the differential housing and each of the said plurality of gears.

In witness whereof, I hereunto subscribe my name this 18th day of October, 1923.

CECIL HAMELIN TAYLOR.